United States Patent Office 2,920,065
Patented Jan. 5, 1960

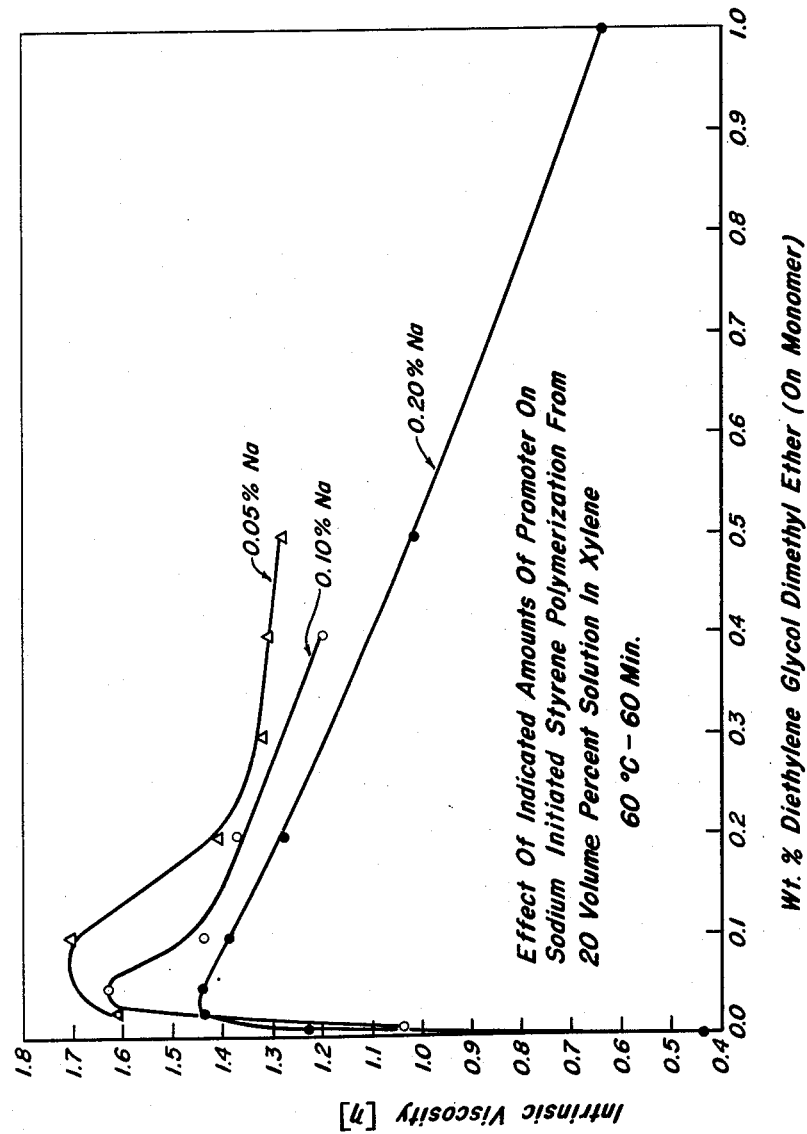

2,920,065

STYRENE POLYMERIZATION INITIATED BY SODIUM AND PROMOTER

Ralph W. Myerholtz, Jr., Highland, and Donald E. Burney, Griffith, Ind., assignors to Standard Oil Company, Chicago, Ill., a corporation of Indiana Application February 28, 1957, Serial No. 643,025

11 Claims. (Cl. 260—93.5)

This invention relates to an improved styrene polymerization process wherein styrene is polymerized from a solution thereof in an aromatic or saturated hydrocarbon solvent with a catalytic amount of dispersed sodium to serve as a reaction initiator, and it pertains more particularly to modifying the polymerization by the use of minute amounts of a substance which is herein referred to as a promoter.

It is known that styrene may be polymerized from a solution thereof in a non-polymerizable hydrocarbon solvent such as xylene, ethylbenzene, toluene, benzene, or a mixture thereof by use of about .1 to .6 percent by weight, based on styrene, of sodium which is finely dispersed so that it has a particle size of about 1 to 100 microns. Thus, at 100° C., polymers having an intrinsic viscosity of about 0.1 were obtained while at 60° C. a polymer having an intrinsic viscosity of the order of 1 was obtained.

An object of our invention is to provide an improvement on this polymerization technique. A further object is to obtain a higher molecular weight polymer at a given temperature with smaller amounts of catalyst than have heretofore been required. An important object is to control the polymerization reaction rate so that close polymerization temperature control is possible. Another objective is to produce a polymer having a more uniform molecular weight and more desirable properties than have heretofore been obtained. Other objects will be apparent from the following detailed description.

We have discovered that dihydric alcohol-dialkyl ethers or ethylene glycol dialkyl ethers, such as ethylene glycol dimethyl ether, diethylene glycol dimethyl ether, triethylene glycol dimethyl ether, tetraethylene glycol dimethyl ether, or the like, have a remarkable promoting effect in styrene polymerization when employed with dispersed sodium in sufficiently small amounts, preferably of the order of about .01 to .5 percent but in all cases not more than 1 percent based on styrene monomer. The practical operating range of promoter concentration is thus very narrow and the preferred range is between about .03 and .2 weight percent based on styrene monomer. Amounts of promoter larger than about 1 weight percent result in reaction rates which are too fast to permit control of the reaction, an undesirable decrease in product molecular weight, and/or an impairment of product quality. On the other hand, the use of at least .01 and preferably at least .03 weight percent of the defined promoter enables the polymerization to be effected with lesser amounts of sodium than heretofore required, produces a much higher molecular weight product than is obtainable under like conditions in the absence of promoter and results in a final product of greater uniformity and superior properties. Dispersed sodium is used in effective concentrations in the range of about 0.01 to about 0.5 percent by weight based on monomer.

The invention will be more clearly understood from the following detailed description of preferred examples read in conjunction with the accompanying drawing which is a chart graphically showing the effect of indicated amounts of promoter on sodium initiated styrene polymerization at 60° C. for 60 minutes for a 20 volume percent solution of stryrene in xylene.

To demonstrate the effect of amounts of our promoter in styrene polymerization, a series of reactions were carried out in 1 liter glass flasks fitted with a reflux condenser and connected to a manostat-controlled vacuum line. Feed for all runs was a 20 volume percent solution of styrene in m-xylene, which feed was percolated through a column of 8–10 mesh alumina dessicant prior to its actual use in order to insure removal of water and other impurities. The catalyst was a 50 weight percent dispersion of sodium in xylene in the form of particles about 10 to 20 microns in size; the catalyst or initiator is thus usually prepared as a concentrated dispersion which may be diluted with xylene or other diluent prior to actual use. The promoter was diethylene glycol dimethyl ether which was redistilled from sodium prior to use. Generally the promoter and sodium were mixed just prior to addition to the reaction mixture, but equivalent results may be obtained by adding the promoter to the polymerization feed and then adding the sodium alone, after reaction temperature has been reached. Prior to addition of the initiator, the pressure was reduced to the point which caused the reaction mixture to boil at the desired reaction temperature which in this case was 60° C. After catalyst addition there was an induction period which varied with sodium concentration, promoter concentration, etc. and the induction period was followed by a period of vigorous reaction usually lasting about 1 to 20 minutes or more; each test was continued for 60 to 90 minutes after the beginning of vigorous reaction. After the run, an aliquot of the resulting polymer solution was diluted with benzene and precipitated by addition of methanol. Conversion and intrinsic viscosities were determined on the dried polymer, intrinsic viscosities being measured in benzene at 30° C. and expressed in deciliters per gram.

The first series of tests was made with .025 percent sodium based on monomer at 60° C. for a reaction period of 90 minutes with the following results:

| Percent Promoter | n | Percent Conversion |
|---|---|---|
| 0.05 | 1.31 | 95 |
| 0.10 | 1.19 | 91 |
| 0.15 | 1.18 | 90 |
| 0.20 | 1.13 | 90 |

(90 minute reaction period)

The feed stock apparently was somewhat impure as evidenced by lower intrinsic viscosities than would be expected but this series of tests nevertheless shows that for maximum conversion and maximum molecular weight the amount of promoter should be of the order of about .05 weight percent based on monomer.

The next three series of tests were made with .05 percent sodium, 0.10 percent sodium and 0.2 percent sodium at 60° C. for 60 minutes with results shown in the following three tables and plotted in the annexed drawing:

.05% sodium

| Percent Promoter | n | Percent Conversion |
|---|---|---|
| 0.025 | 1.61 | 84 |
| 0.05 | 1.70 | 93 |
| 0.20 | 1.46 | 97 |
| 0.30 | 1.32 | 99 |
| 0.40 | 1.31 | 94 |
| 0.50 | 1.28 | 96 |

(60 minute reaction period)

.1% sodium

| Percent Promoter | n | Percent Conversion |
|---|---|---|
| 0.01 | 1.04 | 89 |
| 0.025 | 1.60 | 96 |
| 0.05 | 1.63 | 96 |
| 0.10 | 1.44 | 93 |
| 0.20 | 1.37 | 86 |
| 0.40 | 1.20 | 97 |

(60 minute reaction period)

.2% sodium

| Percent Promoter | n | Percent Conversion |
|---|---|---|
| 0 | 0.44 | 86 |
| 0.01 | 1.23 | 90 |
| 0.025 | 1.44 | 94 |
| 0.05 | 1.44 | 93 |
| 0.10 | 1.39 | 95 |
| 0.20 | 1.28 | 96 |
| 0.50 | 1.02 | 99 |
| 1.00 | 0.64 | 93 |

(60 minute reaction period)

The foregoing data, as shown by the annexed drawing, show that the intrinsic viscosities of the polymer increase at a very great rate up to about .03 weight percent promoter while the curve tends to level off at amounts of promoter in the range of about .2 to .5 weight percent. Under the conditions of the foregoing tests, amounts of promoter larger than .5 weight percent resulted in a reaction rate which was too rapid for practical control. However, with different concentrations of styrene in solvent which may range from about 5 to 40 percent and with different polymerization temperatures which may be in the range of 20° to 100° or 150° C. but are usually at least 40 but below about 80° C., the amounts of promoter will lie within the range of about .01 to 1 weight percent based on monomer and usually in the lower part of this range. Preferably the amount of promoter is less than the amount of sodium on a mol basis.

In another series of tests a 20 percent solution of styrene in m-xylene was polymerized at 58° C. for 65 minutes (after start of polymerization) in a series of tests made in the manner substantially as hereinabove described, in order to compare the effectiveness of a conventional dispersed sodium catalyst and a sodium dispersion promoted with 1,2-dimethoxyethane (ethylene glycol dimethyl ether). The promoted dispersion was prepared by adding 1.2 ml. of a 50 percent dispersion of sodium in p-xylene to a mixture of 3 ml. of m-xylene and 12.5 ml. of 1,2-dimethoxyethane. The sodium particles turned from gray to a light tan. This mixture was thoroughly agitated and then 10 ml. was withdrawn and diluted by adding to 100 ml. of m-xylene. Portions of the diluted mixture were used for polymerizations for comparison with polymerizations made with like amounts of unpromoted dispersed sodium with the following results:

| | Percent Conversion of Monomer | Intrinsic Viscosity |
|---|---|---|
| .02 wt. percent Na (dispersed) | 22 | 1.02 |
| .02 wt. percent Na (dispersed and promoted) | 60 | 1.83 |
| .04 wt. percent Na (dispersed) | 45 | 1.01 |
| .04 wt. percent Na (dispersed and promoted) | 90 | 1.76 |
| .08 wt. percent Na (dispersed) | 69 | .88 |
| .08 wt. percent Na (dispersed and promoted) | 96 | 1.59 |

From the foregoing data it is apparent that the promoted sodium dispersion gives a higher yield of polymer of higher intrinsic viscosity and in a shorter length of time than does an unpromoted sodium dispersion.

The first series of tests hereinabove set forth employed diethylene glycol dimethyl ether while the latter tests employed monoethylene glycol dimethyl ether. Tetraethylene glycol dimethyl ether (0.5 weight percent based on styrene) was employed with .1 weight percent sodium, also based on styrene, in polymerizing styrene from a 20 percent solution thereof in xylene; polymerization started at 60° C. after a 4 minute induction period and polymerization was very rapid, causing the temperature to rise to 95° C., the product in this case having an intrinsic viscosity of 1.12. These are simply examples of dihydric alcohol-dialkyl ethers or of an ethylene glycol-dialkyl ether. Although the alkyl groups in the dialkyl ether may each have 1 to 4 carbon atoms, at least one of them is preferably a methyl group; diethyl ethers appear to be less satisfactory than dimethyl ethers. The preferred ethylene glycol dimethyl ethers may be represented by the formula $$CH_3(OCH_2CH_2)_nOCH_3$$

where $n$ is a whole number which is preferably not higher than about 20.

While dispersed sodium has been described as the catalyst, it will be understood that other dispersed alkali metals or alloys of alkali metals may be used instead of sodium provided that they exhibit the required catalytic activity; these other alkali metals or alloys thereof are not, however, known to be equivalents of sodium.

Styrene itself was polymerized in the foregoing examples, but it should be understood that other vinyl monomers such as alpha methyl styrene and the like may be used instead of or in admixture with simple sytrene. As above indicated, the monomer is preferably polymerized from a solution thereof in a non-polymerizable hydrocarbon which may be a paraffinic hydrocarbon such as hexane, pentane or the like, a naphthenic hydrocarbon such as cyclopentane or cyclohexane but which is preferably a low boiling aromatic hydrocarbon such as benzene, toluene, xylene or a mixture thereof.

While we do not wish to be bound by any theory of the mechanism of the reaction or the manner in which our improved promoter functions, it appears that the first step in sodium-initiated polymerization of styrene is the formation of a sodium-styrene "adduct." This adduct then dissociates into a sodium ion and a styrene ion radical. The latter is probably the species responsible for the initiation of polymerization. Compounds such as diethylene glycol dimethyl ether should be capable of forming a complex with sodium ions. This would favor dissociation of the adduct and would lead to an increase in polymerization rate. Excessive amounts of the promoter would lead to a decrease in polymer molecular weight since it would cause the formation of more initiator molecules. The complexed sodium ion would be quite bulky; with the proper amount of promoter termination will be delayed, leading to a higher molecular weight than obtained with sodium alone. These promoters may also function by complexing impurities which would cause premature termination of the growing chains, but this function would not explain reduced molecular weight which results from the use of amounts of the defined promoters exceeding about .5 to 1 percent. The following table shows the effect of temperature on intrinsic viscosity with various amounts of dispersed sodium catalyst and diethylene glycol dimethyl ether promoter, the reaction period in this series of tests being 60 minutes.

| Percent Promoter | Percent Na | [n] | | |
|---|---|---|---|---|
| | | T= 60° C. | T= 70° C. | T= 79° C. |
| 0.05 | 0.10 | 1.63 | 1.25 | ---- |
| 0.05 | 0.20 | 1.44 | 1.12 | ---- |
| 0.10 | 0.10 | 1.44 | 1.20 | 0.82 |
| 0.10 | 0.20 | 1.39 | 1.09 | ---- |
| 0.20 | 0.05 | 1.46 | ---- | 0.84 |

(60 minute reaction period)

From the foregoing detailed description it will be seen that the objects of our invention have been attained. While these tests were carried out batch-wise, it is contemplated that polymerization may be carried out in a continuous manner. The catalyst, promoter and solvent may be removed from the polystyrene in manners known to those skilled in the art. By this technique a polystyrene can be produced with properties equivalent or superior to the properties of commercial styrene polymer heretofore produced.

We claim:

1. The method of polymerizing a vinyl monomer consisting essentially of an aromatic hydrocarbon selected from the group consisting of styrene and alpha-methylstyrene from a solution thereof in a non-polymerizable hydrocarbon solvent at a temperature in the range of 20 to 100° C. with an effective amount of a dispersed sodium in the range of about 0.01 to about 0.5 percent by weight, based on said monomer, to serve as a polymerization initiator, which method comprises effecting the polymerization in contact with at least about .01 weight percent but less than 1.0 weight percent based on said vinyl monomer of a dihydric alcohol-dialkyl ether wherein the alkyl groups contain not more than 4 carbon atoms.

2. The method of polymerizing a vinyl monomer consisting essentially of styrene from a solution thereof in a non-polymerizable hydrocarbon solvent at a temperature in the range of 20 to 100° C. with an effective amount of dispersed sodium polymerization initiator in the range of about 0.01 to about 0.5 percent by weight, based on styrene monomer, which method comprises effecting the polymerization in contact with at least about 0.01 weight percent but less than 1.0 weight percent based on styrene monomer of an ethylene glycol dialkyl ether in which the respective alkyl groups have 1 to 4 carbon atoms, inclusive, and recovering a polymer of styrene having an intrinsic viscosity of at least about 0.8 deciliter per gram in benzene solution at 30° C.

3. The method of claim 2 wherein the ether is a dimethyl ether.

4. The method of claim 2 wherein the ether is ethylene glycol dimethyl ether.

5. The method of claim 2 wherein the ether is diethylene glycol dimethyl ether.

6. The method of polymerizing a vinyl monomer consisting essentially of styrene from a 5 to 40 percent solution thereof in a hydrocarbon solvent at a temperature above 40 but below 80° C. with a dispersed sodium catalyst, which method comprises effecting the polymerization with an amount of dispersed sodium catalyst in the range of .01 to .5 weight percent and an amount of an ethylene glycol dimethyl ether in the range of .01 to .5 percent by weight, each percentage being based on styrene monomer, and recovering a polymer of styrene having an intrinsic viscosity of at least about 0.8 deciliter per gram in benzene solution at 30° C.

7. The method of claim 6 wherein the amounts of said sodium and said ether respectively do not exceed about .2 weight percent.

8. The method of claim 6 wherein said ether is diethylene glycol dimethyl ether and less than 1 mol of said ether is employed per gram atom of sodium.

9. The process of claim 1 wherein said hydrocarbon solvent is a low boiling aromatic hydrocarbon.

10. The process of claim 1 wherein said hydrocarbon solvent is a paraffinic hydrocarbon.

11. The process of claim 1 wherein said vinyl monomer consists essentially of styrene.

References Cited in the file of this patent
UNITED STATES PATENTS
2,327,082   Walker _____ Aug. 17, 1943